United States Patent
Jacobs

(10) Patent No.: US 7,207,539 B1
(45) Date of Patent: Apr. 24, 2007

(54) LEG-MOUNTED MOUSE PAD AND METHOD OF USE

(76) Inventor: Ronald Jacobs, 58 Desert Highland, Henderson, NV (US) 89052

(*) Notice: Subject to any disclaimer, the term of this patent is extended or adjusted under 35 U.S.C. 154(b) by 316 days.

(21) Appl. No.: 10/944,587

(22) Filed: Sep. 17, 2004

(51) Int. Cl.
*A47B 91/00* (2006.01)

(52) U.S. Cl. .......... 248/346.01; 400/715; 248/918; 248/118.1; 248/118.5

(58) Field of Classification Search .......... 248/118, 248/118.1, 118.3, 118.5, 346, 444, 918, 346.01; 224/222, 267, 270; 108/43; 400/715
See application file for complete search history.

(56) References Cited

U.S. PATENT DOCUMENTS

| | | | | |
|---|---|---|---|---|
| 1,274,312 | A | * | 7/1918 | Nicoll .......... 224/222 |
| 3,828,696 | A | * | 8/1974 | Lockridge .......... 108/43 |
| 4,195,880 | A | * | 4/1980 | Henkhaus .......... 297/188.18 |
| 5,203,845 | A | * | 4/1993 | Moore .......... 248/118 |
| 5,332,185 | A | * | 7/1994 | Walker, III .......... 248/346.2 |
| 5,355,811 | A | | 10/1994 | Brewer |
| 5,433,407 | A | * | 7/1995 | Rice .......... 248/118.1 |
| 5,593,128 | A | | 1/1997 | Odom et al. |
| 5,623,869 | A | * | 4/1997 | Moss et al. .......... 108/43 |
| D392,960 | S | | 3/1998 | Giorgio |
| 5,738,325 | A | * | 4/1998 | Brown .......... 248/346.01 |
| 5,765,790 | A | * | 6/1998 | Kuldvere .......... 248/118 |
| 5,779,211 | A | | 7/1998 | Bird |
| 5,826,842 | A | * | 10/1998 | Paulse et al. .......... 248/118.1 |
| 5,893,540 | A | * | 4/1999 | Scott .......... 248/118 |
| 5,911,397 | A | * | 6/1999 | Jokinen et al. .......... 248/346.01 |
| 5,937,765 | A | * | 8/1999 | Stirling .......... 108/43 |
| 6,043,808 | A | * | 3/2000 | Perry .......... 345/163 |
| 6,187,398 | B1 | | 2/2001 | Eldridge |
| D453,163 | S | | 1/2002 | Pitlo |
| 6,368,693 | B1 | | 4/2002 | Livingstone et al. |
| 6,439,530 | B1 | * | 8/2002 | Schoenfish et al. .... 248/346.06 |
| 6,648,282 | B1 | * | 11/2003 | Sykes .......... 248/118 |
| 6,767,605 | B1 | * | 7/2004 | Raciborski .......... 428/100 |
| 6,962,311 | B1 | * | 11/2005 | Sykes .......... 248/118 |

* cited by examiner

*Primary Examiner*—Kimberly Wood
(74) *Attorney, Agent, or Firm*—Rob L. Phillips; Greenberg Traurig

(57) ABSTRACT

A leg-mounted mouse pad for use with a computer cursor control device, said mouse pad comprising a generally oval-shaped flexible platform having a bottom surface and a top surface, wherein at least a portion of said top surface is adapted for use with a computer cursor control device. At least two bilaterally opposed pockets formed adjacent a perimeter of each half of the oval shaped mouse pad, the pockets adapted to contain a weighted media suitable for positioning the flexible platform on the leg of a user, the platform being substantially flexible such that when weight is contained with the pockets, the platform substantially conforms the surface of the user's leg.

4 Claims, 2 Drawing Sheets

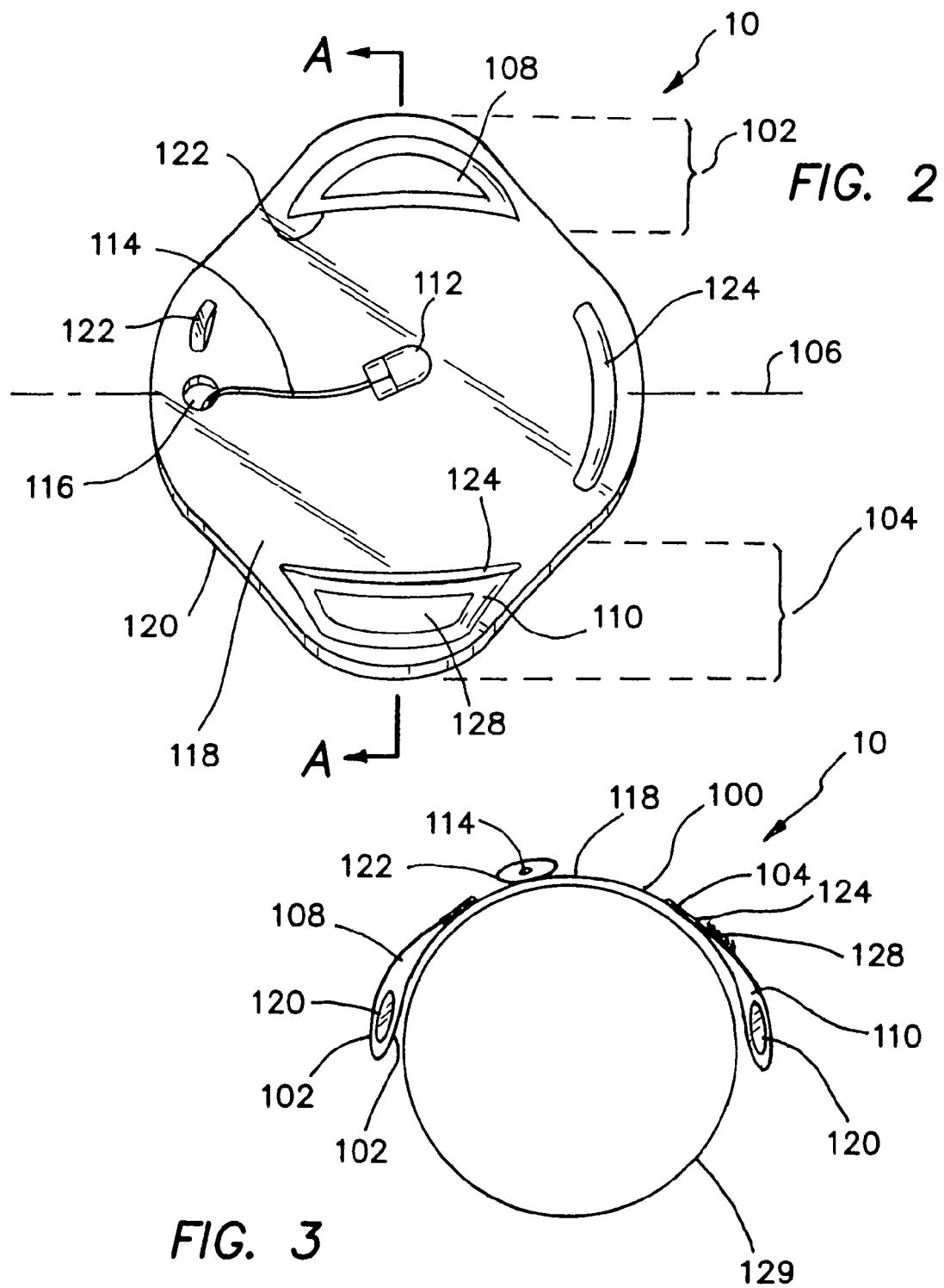

LEG-MOUNTED MOUSE PAD AND METHOD OF USE

FIELD OF THE INVENTION

The present invention relates to a mouse pad. Specifically, the present invention is a flexible mouse pad capable of being positioned on a user's leg.

BACKGROUND

For many people, a working day typically means sitting at an office desk in front of a computer. Even in our free time, most of us use computers. We may use them for surfing the Internet, typing emails to family and friends, or playing video games. Whether it is for business or for recreational purposes, a computer mouse is generally used in order to control the computer applications. In turn, a computer mouse pad is usually required to operate the mouse.

However, users of currently available mouse pads have discovered that these mouse pads have several significant drawbacks. The primary drawback of conventional computer mouse pads is that they are commonly located at the side of the keyboard or on the same work surface that supports the computer or monitor. This placement requires that the user's arm be situated in an unnatural, flat position. It also generally necessitates that the user's arm be positioned out in front of him or her for long periods of time. These positions can put pressure on various muscles, which can result in stress to the fingers, wrist, arm, shoulder, and back areas. Consequently, a common complaint among computer users is that they experience discomfort when working with a computer mouse. Additionally, more than simple discomfort, the unnatural positioning of the user's arm may lead to more serious medical problems, such as carpal tunnel syndrome. Lower back injury is another physical problem that may be encountered because, in order to reach the mouse, the user is typically forced to lean forward or sit on the edge of his chair without the support of the chair's back. This places a great deal of stress on the lower back and may also contribute to bad posture.

Another drawback is that mouse pads take up space on computer work areas. A cluttered desk often leaves very little room for a mouse or mouse pad. Even the most organized computer user typically has a need to save valuable workspace for other computer devices, such as for speakers, printers, scanners, and the like. Moreover, with laptop computers there may be no workspace at all in which to use an external mouse. Because laptop computers are frequently used when traveling in a car or on a plane, there may be no available workspace for operating an external mouse.

A final drawback is that users may develop eyestrain because users are required to sit very close to their computer monitors in order to access their mouse pads, which are usually located on the same workspace as the monitor or keyboard. Thus, eye problems are another common complaint among users, who may work on a computer for hours at a time with only inches between their eyes and the bright monitor screen.

Thus, it can be seen that there is a need in the art for a mouse pad that may be used without the need for an external working surface area. The above-noted shortcomings are overcome by the mouse pad embodiments of the present invention. As set forth in more detail below, the shortcomings of the conventional mouse pads are overcome by being conveniently positioned on a user's leg, while still retaining their traditional function.

SUMMARY

While the objects of the embodiments of the present invention are too numerous to fully list, several objects are listed herein for reference.

It is an object of the embodiments of the present invention that the leg mouse pad, reduce eyestrain by enabling the user to sit an extended distance from the computer monitor.

It is a further object that the mouse pad alleviate arm pain and back discomfort by allowing the user to work with a computer mouse in a more natural, relaxed position.

It is a further object that the mouse pad be used without the need for external workspace, thereby alleviating clutter and providing additional surface space for user.

Accordingly, the objectives of the embodiments of the present invention are accomplished by the invention described below.

In accordance with the present invention there is provided a mouse pad capable of being positioned on a user's leg. In general, the leg-mounted mouse pad comprises a flexible platform surface adapted for use with a computer control cursor or mouse, and a pair of saddlebags or pockets. The platform surface having the general shape of an ellipse or elongated circle is constructed such that in use the surface is sufficiently flexible to conform to the dorsal surface of a user's leg. Each one of a pair of pockets, located approximately equidistant from the center of the ellipse, comprises a cavity filled with a weighted material such as sand. The pockets are designed to drape the lateral and medial surfaces of a user's thigh and thereby prevent unwanted movement of the flexible platform-working surface.

A cord clip or other retaining means may also be located on the surface of flexible platform to keep the cord of the computer cursor control device out of the way of the user when operating the cursor device. When not in use, the mouse is removably coupled to the pockets.

Further objects, features, and advantages of the present invention will become apparent from the brief description of the drawings, the drawings and the detailed description which follow.

BRIEF DESCRIPTION OF THE DRAWINGS

Details of the present invention will be further understood upon reference to the drawings, wherein:

FIG. 2 is a top view of an embodiment of a leg mounted mouse pad;

FIG. 3 is a cross sectional view of an embodiment from the perspective A towards A' as seen in FIG. 2.

DETAILED DESCRIPTION

The present invention will be described in relation to a first embodiment. It is to be understood, that various modifications, changes, substitutions of equivalents and other alterations can be made without departing from the inventive concept. It is intended that the present invention shall be limited only by the appended claims. Like numbers will be used to drawings to indicate the same or similar portions of the invention.

Figure 1:
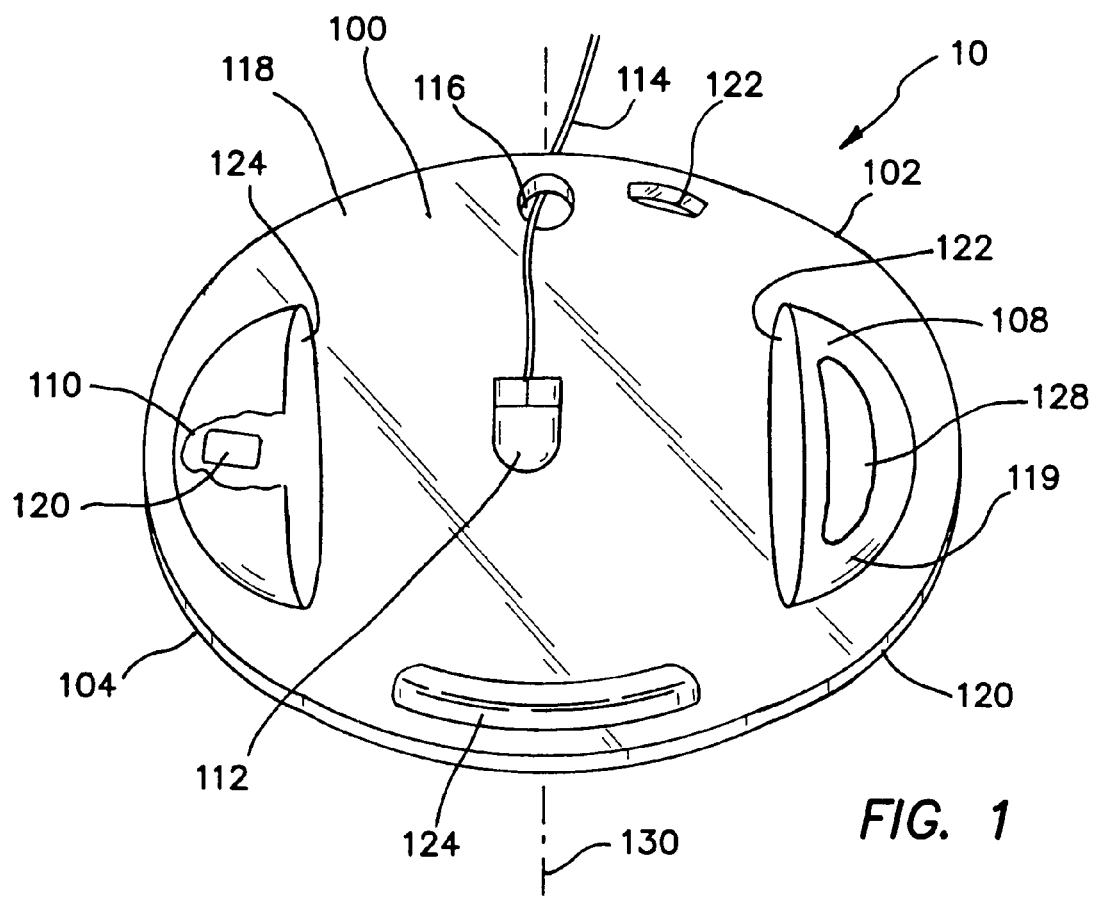
FIG. 1 is a top view of an embodiment of a leg mounted mouse pad.

FIGS. 1, 2 & 3, illustrate embodiments of the invention in which leg-mounted mouse pad 10 having the general shape of an ellipse or oval is comprised of flexible platform surface 100 adapted for use with a computer cursor control device or mouse. The mouse pad 10 includes two arms 102 and 104, each of which extends distally from a transverse axis 106, and a first cavity 108 disposed on the first arm 102 and a second cavity 110 disposed on the second arm 104. A mouse 112 and mouse cord 114 are shown lying on the flexible platform surface 100.

In some embodiments, mouse cord 114 is inserted through an opening or a hole 116 through a top surface 118 and a bottom surface 120 of flexible platform surface 100 to prevent mouse cord 114 from becoming disengaged from top surface 118 of leg mouse pad 10. In other embodiments, flexible platform surface 100 of leg-mounted mouse pad 10 further comprises a loop 122 affixed to the top surface 118 through which a mouse cord 114 is inserted to prevent unwanted movement of mouse cord 114 off the top surface 118. While loop 122 and hole 116 are described, it is understood that unwanted movement of mouse cord 114 can be restrained by any suitable means such as a clip strap, fastener or hook and lop fasteners such as VELCRO®.

In some embodiments, top surface 118 is coupled with a wrist rest or pad 124 to provide comfort to a user's arm (not shown) when using leg-mounted mouse pad 10. Wrist rest 124 is made of any conventional construction and is removably or permanently coupled with top surface 118 by any conventional means.

In some embodiments, a coupling means 128 is affixed to top surface 119 and a corresponding coupling means (not shown) is attached to any surface of mouse 112. The coupling means 128 allows the mouse 112 to be removably coupled to top surface 119 of cavities 108, 110 when mouse 112 is not in use. It is noted that removable coupling means 128 can be disposed along any portion of top surface 118 of the flexible platform 100. For example, the coupling means 128 may be disposed along a top surface 118 of arm 102 or arm 104. In some embodiments, coupling means 128 include a snap, hook, or hook and loop devise fasteners such as VELCRO®.

Figure 4:
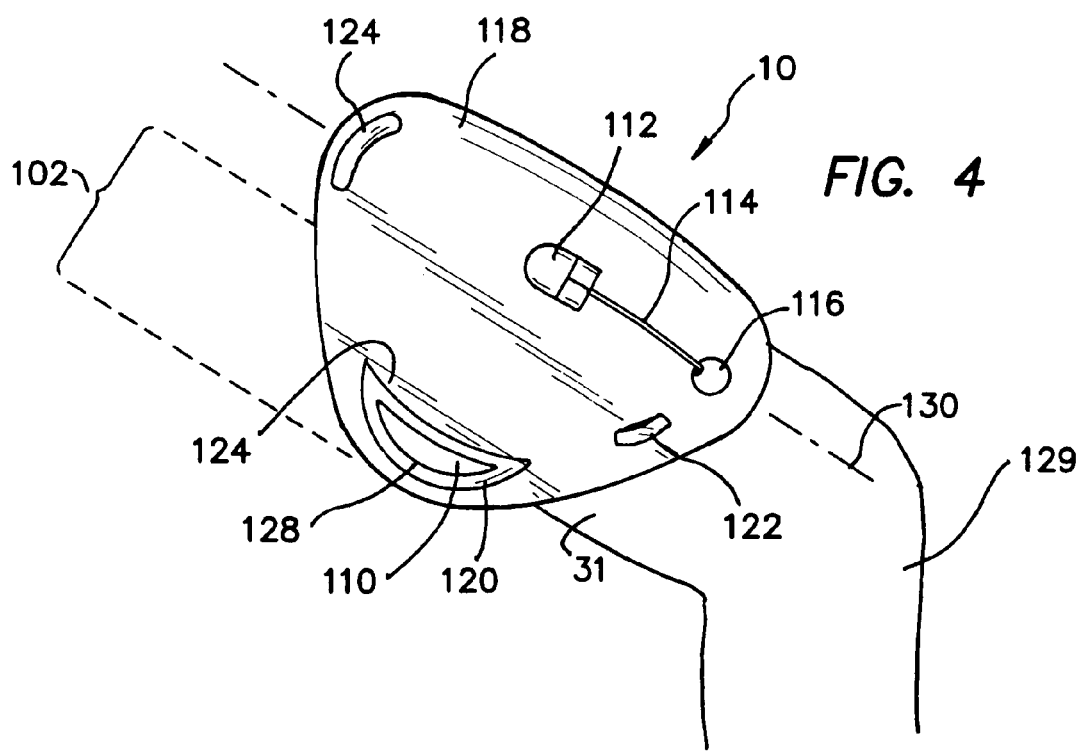
FIG. 4 is a side perspective view of an embodiment of the present invention.

Referring now to FIG. 4, for ease of reference, embodiments of the present invention are described from the perspective of a user who places leg mouse pad 10 on a right leg 129, namely a thigh 131, such that wrist rest 124 is proximate the user's torso (not shown) and hole 116 is distal the user's torso. Those skilled in the art however, will appreciate that leg mouse pad 10 is constructed to be positioned on either a right or on a left leg of the user. When flexible platform surface 100 is placed over a user's leg 129 the flexible platform surface 100 must be sufficiently flexible to generally bend and conform to a top surface of the user's leg 129 along a transverse axis 130 of the user's leg 129 such that transverse axis 106 (shown in FIG. 1) is generally aligned with transverse axis 130 of the user's leg 129. When flexible platform 100, having arms 102 and 104, is placed over the user's leg 129 in the manner described, flexible platform 100 and each arm 102 & 104 drapes at least a portion of the user's leg 129. Flexible platform surface 100 is made of any natural or synthetic materials such as leather, wool, canvas, vinyl or rubber or any combination thereof which are sewn or glued together. Those skilled in the art will appreciate that many other materials and combinations of materials can be used to accomplish this objective without departing from the scope of the invention.

Cavities 108 & 110, best shown in FIG. 3, are formed between layers of material forming flexible platform surface 100 and constructed to house or contain a weight 120, such as sand. In some embodiments, cavities 108 & 110 have resealable openings 122 & 124 through which any suitable weighted media is inserted into cavities 108 & 110 by the user. Those skilled in the art will appreciate that resealable openings 122 & 124 may be constructed by any conventional resealable means such as buttons, snaps, zippers, zip-lock devices, or hook and loop fasteners such as VELCRO®. In some embodiments, cavities 108 & 110 are filled with weight 120 during manufacture while in other embodiments first and second cavities 108 & 110 are filled with weight 120 selected by the user prior to use.

As shown in FIG. 4, in use, arm 102 is positioned on a medial side of the user's right leg 129, such that leg-mounted mouse pad 10 is positioned on the leg 129 according to the preference of the user. Top surface 118 and bottom surface 120 of leg-mounted mouse pad 10 are fabricated of a flexible material to allow top and bottom surfaces 118 & 120 of leg mouse pad 10 to substantially conform to the contour of the user's leg 129 when weight 120 is positioned in first and second cavities 108 & 110. The weight 120 housed in the first and second cavities 108 & 110 is comprised of any suitable weighted media such as sand, water or gel. When filled with a fluid media such as water or gel, cavities 108 & 110 are each lined with a suitable water retaining membrane (not shown).

METHOD OF USE

A method in accordance with an embodiment of the present invention for using leg mouse pad 10 generally comprises placing bottom surface 120 of leg-mounted mouse pad 10 on a user's leg 129 such that the first arm 102 is positioned on a medial side of a user's leg and a second arm 104 is positioned on an lateral side of user's leg 129 wherein the flexible platform surface 100 is sufficiently flexible to drape at least a portion of the user's leg 129; locating a computer cursor control device 112 on a flexible platform surface 100 of leg-mounted mouse pad 10; and operating the computer cursor control device 112 with the user's arm in a relaxed position to provide comfort to user's arm and shoulder.

Although the invention has been described in detail with reference to multiple embodiments, additional variations and modifications exist within the scope and spirit of the invention as described and defined in the following claims.

I claim:

1. A leg-mounted mouse pad for use with a computer cursor control device, said mouse pad comprising:
   (a) a generally oval-shaped platform having a transverse axis wherein the platform is adapted for use with the computer cursor control device, the platform comprising a first arm extending distally from the transverse axis and second arm extending distally from the transverse axis in a direction opposite the first arm, the entire platform being sufficiently flexible to drape a portion of a user's leg and further supporting a wrist rest;
   (b) a first cavity disposed along the first arm and a second cavity disposed along the second arm, said cavities for retaining a weighted media such that the weighted media causes said platform to substantially conform to a surface contour of the user's leg;

(c) at least one coupling means positioned on a top surface of the platform, said coupling means for restraining a mouse when not in use; and (d) means proximate the top surface of the flexible platform surface to restrain unwanted movements of a mouse cord, said means comprising a hole through said oval-shaped platform.

2. The leg-mounted mouse pad of claim 1 wherein the coupling means comprises hook and loop fasteners.

3. A leg-mounted mouse pad for use with a computer cursor control device, said mouse pad comprising:

(a) a generally oval-shaped platform having a transverse axis wherein the platform is adapted for use with the computer cursor control device and wherein, said entire platform is sufficiently flexible to drape a portion of a user's leg;

(b) a first arm extending distally from the transverse axis and second arm extending distally from the transverse axis in a direction opposite the first arm;

(c) a first cavity disposed along the first arm and a second cavity disposed along the second arm wherein each one of the cavities includes a resealable opening;

(d) at least one coupling means disposed along a top surface of at least one of said arms, said coupling means operable to restrain the computer cursor control device during periods of non-use;

(e) a hole through the flexible platform surface, the hole for preventing a cord of the computer cursor control device from becoming disengaged from a top surface of the flexible platform; and (f) a wrist resting means.

4. The mouse pad of claim 3 wherein a weighted media, housed in each one of the first and second cavities, causes said platform to substantially conform to a surface contour of the user's leg.

* * * * *